United States Patent
Hwang et al.

(10) Patent No.: US 9,676,935 B2
(45) Date of Patent: Jun. 13, 2017

(54) POLYOXYMETHYLENE RESIN COMPOSITION

(71) Applicants: Hyundai Motor Company, Seoul (KR); Korea Engineering Plastics Co., Ltd., Seoul (KR)

(72) Inventors: Duck Hyoung Hwang, Seoul (KR); Gyung Seob Byun, Gyeonggi-do (KR); Seung Chin Park, Seoul (KR); Chang Ho Lee, Seoul (KR); Hyo Je Seong, Seoul (KR)

(73) Assignees: Hyundai Motor Company, Seoul (KR); Korea Engineering Plastics Co., Ltd., Seoul (KR)

( * ) Notice: Subject to any disclaimer, the term of this patent is extended or adjusted under 35 U.S.C. 154(b) by 150 days.

(21) Appl. No.: 14/524,645

(22) Filed: Oct. 27, 2014

(65) Prior Publication Data
US 2015/0184110 A1 Jul. 2, 2015

(30) Foreign Application Priority Data
Dec. 31, 2013 (KR) .................. 10-2013-0168023

(51) Int. Cl.
C08L 61/00 (2006.01)
C08G 16/02 (2006.01)
C08L 59/02 (2006.01)
E05C 17/20 (2006.01)

(52) U.S. Cl.
CPC ............ *C08L 59/02* (2013.01); *E05C 17/203* (2013.01)

(58) Field of Classification Search
CPC ................................ C08L 61/00; C08G 16/02
USPC .......................................... 523/400; 525/472
See application file for complete search history.

(56) References Cited

U.S. PATENT DOCUMENTS

| 3,219,623 | A | 11/1965 | Berardinelli et al. | |
| 5,719,238 | A * | 2/1998 | Flood | C08L 73/00 524/269 |
| 6,358,626 | B1 * | 3/2002 | Persson | B29C 49/0047 428/122 |
| 6,512,047 | B2 * | 1/2003 | Kim | C08F 255/00 525/399 |
| 7,098,262 | B2 * | 8/2006 | Kim | C08L 59/00 524/310 |
| 7,914,882 | B2 | 3/2011 | Erb et al. | |
| 8,445,089 | B1 * | 5/2013 | Fan | C08L 59/04 264/109 |
| 9,303,145 | B2 * | 4/2016 | Markgraf | C08G 18/56 |
| 2005/0043492 | A1 * | 2/2005 | Chin | C08K 5/1539 525/455 |
| 2006/0111507 | A1 * | 5/2006 | Papke | C08L 59/00 524/593 |
| 2007/0066746 | A1 * | 3/2007 | Gunnewig | C08L 75/08 524/500 |
| 2007/0202332 | A1 * | 8/2007 | Gunnewig | C08J 3/12 428/402 |
| 2007/0220811 | A1 * | 9/2007 | Flendrig | B60J 5/0416 49/352 |
| 2007/0222249 | A1 * | 9/2007 | Valentage | B60R 13/0243 296/39.1 |
| 2008/0193702 | A1 * | 8/2008 | Cupta | C08K 7/02 428/66.2 |
| 2010/0144955 | A1 * | 6/2010 | El-Hibri | C08G 75/23 524/514 |
| 2012/0129976 | A1 * | 5/2012 | Ratnagiri | C08J 3/005 523/400 |
| 2013/0078481 | A1 * | 3/2013 | Gronner | C25D 5/54 428/556 |
| 2013/0137811 | A1 * | 5/2013 | Fan | C08L 59/02 524/512 |
| 2014/0142228 | A1 * | 5/2014 | Klug | C08L 59/02 524/169 |
| 2014/0179865 | A1 * | 6/2014 | Markgraf | C08K 7/14 524/593 |
| 2015/0065654 | A1 * | 3/2015 | Markgraf | C08L 59/00 525/154 |
| 2015/0065661 | A1 * | 3/2015 | Peters | C08L 59/02 525/390 |
| 2015/0111796 | A1 * | 4/2015 | Zia | C08J 3/22 508/107 |
| 2015/0133351 | A1 * | 5/2015 | Pasternak | F16C 33/205 508/106 |
| 2015/0299544 | A1 * | 10/2015 | Markgraf | C08L 59/02 524/102 |

FOREIGN PATENT DOCUMENTS

| EP | 2581408 A1 | 4/2013 |
| EP | 2647666 A1 | 10/2013 |
| KR | 20020088195 A | 11/2002 |
| KR | 20060031395 A | 4/2006 |
| KR | 10-2006-0129215 A | 12/2006 |
| KR | 20090022835 A | 3/2009 |
| KR | 20100085981 A | 7/2010 |
| KR | 10-2010-0117648 A | 11/2010 |
| KR | 10-2011-0099295 A | 9/2011 |
| KR | 20120056027 A | 6/2012 |
| WO | 91/08895 A2 | 6/1991 |
| WO | 02/083794 A2 | 10/2002 |

* cited by examiner

*Primary Examiner* — Ellen McAvoy
(74) *Attorney, Agent, or Firm* — Mintz Levin Cohn Ferris Glovsky and Popeo, P.C.; Peter F. Corless

(57) ABSTRACT

A novel polyoxymethylene resin composition is provided, which may be availably used as engineered plastics in various industrial fields and products, such as vehicle parts. The poly resin includes polyoxymethylene, aramide fibers, and thermoplastic polyurethane, thereby providing the novel composition of polyoxymethylene resin and improving various physical properties thereof, such as thermal stability.

7 Claims, No Drawings

POLYOXYMETHYLENE RESIN COMPOSITION

CROSS-REFERENCE TO RELATED APPLICATION

This application claims under 35 U.S.C. §119(a) the benefit of Korean Patent Application No. 10-2013-0168023 filed on Dec. 31, 2013, the entire contents of which are incorporated herein by reference.

TECHNICAL FIELD

The present invention relates to a polyoxymethylene resin composition. In particular, the present invention provides a novel polyoxymethylene resin composition which may be used as engineered plastics in various industrial products, such as vehicle parts. The polyoxymethylene resin may include: polyoxymethylene, aramide fibers, and thermoplastic polyurethane, thereby providing a novel composition and improving various physical properties thereof, such as thermal stability.

BACKGROUND

A polyoxymethylene resin has been generally known to have an excellent mechanical property, creep resistance, fatigue resistance, and friction and wear resistance as engineered plastics, and thus may be applied to various industries and industrial products, such as electrical/electronics instrument or vehicles. However, the currently used polyoxymethylene resin may have drawbacks. For example, thermal stability of conventional polyoxymethylene resin may be poor and decomposition may occur due to thermal impact, mechanical impact, or additives during a forming process. Particularly, when a colorant is used, decomposition may significantly progress, brittleness may increase, and processability may be reduced.

Therefore, there has been a growing demand for improvement of such polyoxymethylene resin, particularly for vehicle parts, in which heat resistance, a lubricating property, and the like, may be required and various kinds of mechanical properties and forming properties may be required due to frequent operations, operation friction, and the like. For example, among the vehicle parts, a door checker may be a part to which a polyoxymethylene resin formed material is generally applied. Since, the door checker allows a door of a vehicle to be opened in stages when the door of the vehicle is opened, improved heat resistance, the lubricating property, the forming property, and various mechanical properties may be required.

Various methods in related arts have been developed to improve thermal stability of polyoxymethylene. A polyoxymethylene resin composition including (A) 100 parts by weight of a polyoxymethylene polymer that is a homopolymer or a copolymer of oxymethylene and has a molecular weight of 10,000 to 200,000 g/mol; (B) 0.01 to 5 parts by weight of a melamine resin; and (C) 0.01 to 5 parts by weight of a polyoxyethylenepolyoxypropylene block copolymer that has an average molecular weight of 7,000 or more and less than 10,000 has been reported to improve thermal stability. In another example, a polyoxymethylene resin composition which includes (B) 0.005 to 2 parts by weight of an amine-substituted triazine compound, (C) 0.01 to 5 parts by weight of a compound where 0.05 to 5 wt % of maleic anhydride is grafted to an ethylene-propylene copolymer and an ethylene-propylene trimer, and (D) 0.001 to 2 parts by weight of 1,12-dodecane dicarboxylic acid dihydrazide based on (A) 100 parts by weight of a polyoxymethylene polymer has been developed. Meanwhile, although the examples of the related arts may reduce generation of formaldehyde gas and improve thermal stability, a tribology property and hardness thereof may not be improved.

In this respect, a polyacetal composition including (i) a polyacetal resin, (ii) a p-aramide particle, and (iii) a vinyl-ended dimethyl siloxane polymer, has been provided and the composition may have an improved tribology property. However, since viscosity of the vinyl-ended dimethyl siloxane polymer used in the composition is substantially high, uniform mixing may not be performed during compounding. Therefore, long-term dimensional stability of a formed article may be reduced, a forming property may be insufficient, and compatibility with polyoxymethylene may be reduced, thereby causing an exfoliation phenomenon during injection and extrusion forming. Further, when the composition is formed, siloxane may be exposed on a surface of the formed article. As result, when the composition is applied to a formed material, the composition may be prohibited from use in silicone free products.

In addition, various polyoxymethylene resin compositions including polyoxymethylene, a thermoplastic resin, an aramide fiber, urea, and the like, have been developed. However, these resin compositions may be slightly different in their constituents, and insignificant improvement in physical properties, such as heat resistance, dimensional stability, a forming property. Therefore, there is still an unmet need in the technical field for developing a novel resin.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention may provide a technical solution to the above-described problems in related art. For example, typically used resin components, such as, polyoxymethylene, aramide fibers, and thermoplastic polyurethane, may be mixed with a particular component to provide a novel resin composition which may have improved thermal stability and dimensional stability superior tribology property, and other significantly improved physical properties.

Accordingly, the present invention provides a polyoxymethylene resin composition having various improved physical properties, and a novel composition thereof. In addition, the polyoxymethylene resin composition which may have improved thermal stability and dimensional stability and a superior tribology property is provided. Therefore, the polyoxymethylene resin composition according to the present invention may have excellent (e.g., improved) hardness, tensile strength, forming processability and other significantly improved mechanical properties, such as friction- or wear-resistance properties, tensile elongation, and impact strength.

In one aspect, the present invention provides a polyoxymethylene resin composition which may include: polyoxymethylene; an aramide powder; thermoplastic polyurethane; vinyl acetate; ethylene bis-stearamide; and ethylene urea. The polyoxymethylene resin composition may include about 1 to 15 parts by weight of thermoplastic polyurethane, about 0.1 to 1 parts by weight of vinyl acetate, about 0.01 to 2 parts by weight of ethylene bis-stearamide, and about 0.01 to 2 parts by weight of ethylene urea based on 100 parts by weight of a basic resin which comprises about 70 to 99 wt % of polyoxymethylene and about 1 to 30 wt % of the aramide powder.

In another exemplary embodiment, in the polyoxymethylene resin composition, thermoplastic polyurethane may be esters, ethers, lactones, or an alloy mixture thereof. In addition, the polyoxymethylene resin composition may further include a polytetrafluoroethylene powder, an ultra-high molecular weight polyethylene powder having an average molecular weight in a range of about $1 \times 10^6$ to $5 \times 10^6$ g/mol, or a mixture thereof. The polyoxymethylene resin composition may further include about 0.01 to 2 parts by weight of a polytetrafluoroethylene powder, an ultra-high molecular weight polyethylene powder having an average molecular weight in a range of about $1 \times 10^6$ to $5 \times 10^6$ g/mol, or a mixture thereof based on 100 parts by weight of the basic resin.

In another aspect, the present invention provides a formed article having improved friction and wear resistances compared to an article from conventional polyoxymethylene resin by using the polyoxymethylene resin composition according to an exemplary embodiment of the present invention. In an exemplary embodiment, the formed article for vehicles may include a door checker guide which may be formed using the polyoxymethylene resin composition provided in an exemplary embodiment of the present invention. Therefore, the polyoxymethylene resin composition according to the present invention may have improved thermal stability and tribology property.

In addition, the polyoxymethylene resin composition according to the present invention may have significantly improved mechanical properties, such as hardness, tensile elongation, wear resistance, friction resistance, and impact resistance. Further, various formed articles manufactured from the polyoxymethylene resin composition according to an exemplary embodiment of the present invention may have significantly improved life-span property and dimensional stability, and superior forming processability. The polyoxymethylene resin composition according to the present invention also may be applied to various products made from various types of engineered plastic materials in various fields which require heat resistance, a self-lubricating property, and a forming property. Particularly, the polyoxymethylene resin composition may be applied to vehicle parts such as a vehicle door checker.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, various exemplary embodiments of a polyoxymethylene resin composition of the present invention will be described in detail. The following embodiments or exemplary embodiments of an aspect are provided as examples so that this disclosure will fully convey the scope of the present invention to those skilled in the art. Further, the terminologies including technical terms and scientific terms used have the same meanings that those skilled in the art generally understand, if not defined, and the detailed description of a related known function or configuration that may make the purpose of the present invention unnecessarily ambiguous in describing the present invention will be omitted in the following description.

A polyoxymethylene resin composition including polyoxymethylene, an aramide powder, thermoplastic polyurethane, vinyl acetate, ethylene bis stearamide, and ethylene urea is provided. In an exemplary embodiment of the present invention, the polyoxymethylene resin composition may include about 1 to 15 parts by weight of thermoplastic polyurethane, about 0.1 to 1 parts by weight of vinyl acetate, about 0.01 to 2 parts by weight of ethylene bis-stearamide, and about 0.01 to 2 parts by weight of ethylene urea based on 100 parts by weight of a basic resin which comprises about 70 to 99 wt % of polyoxymethylene and about 1 to 30 wt % of the aramide powder.

Hereinafter, each component of the present invention will be described in more detail as an exemplary embodiment.

(A) Polyoxymethylene

As used herein, polyoxymethylene (POM or polyacetal) may be a polymer having an oxymethylene repeating unit. In particular, POM may be a homopolymer, an oxymethylene-oxyalkylene copolymer, or a mixture thereof having the oxymethylene repeating unit.

The homopolymer may be prepared by polymerizing formaldehyde or a cyclic oligomer thereof, for example, trioxane, and the copolymer may be prepared by performing a polymerization reaction of formaldehyde or a cyclic oligomer thereof with alkylene oxide or cyclic formal, for example, 1,3-dioxolane, diethylene glycol formal, 1,4-propanediol formal, 1,4-butanediol formal, 1,3-dioxepane formal, 1,3,6-trioxocane, and the like. Particularly, one or more monomers may be selected from the group of monomers consisting of ethylene oxide, 1,3-dioxolane, and 1,4-butanediol formal, and an oxymethylene copolymer, which have melting points of about 150° C. or greater. In addition, two or more combined carbon atoms in a main chain may be prepared by adding these monomers to trioxane or formaldehyde that may be a main monomer and using a Lewis acid as a catalyst to perform random copolymerization. When the copolymer is used, an amount of a copolymer may be about 20 wt % or less, 15 wt % or less, or particularly about 4 to 5 wt %.

The homopolymer or the copolymer may be stabilized by capping end groups thereof with esterification or etherification. Therefore, the polyoxymethylene copolymer may be stabilized by removing an unstable end-oxymethylene group to obtain a stabilized copolymer having a —CH$_2$CH$_2$OH terminus.

In an exemplary embodiment, the polyoxymethylene may be either a branch type or a straight type. The polyoxymethylene homopolymer or an oxymethylene-oxyethylene copolymer used for polyoxymethylene may have a melting point of about 160° C. or greater, the degree of crystallization of about 65 to 85%, and an average molecular weight of about 10,000 to 200,000 g/mole, 20,000 to 90,000 g/mole, or particularly about 25,000 to 70,000 g/mole. The average molecular weight may be determined by a gel permeation chromatography in m-cresol medium using a DuPont PSM bimodal column kit having a nominal pore size of about 60 to 1000 Å.

In general, for injection molding, a molten flow may be in a range of about 0.1 to 100 g/min, of about 0.5 to 60 g/min, or particularly of about 0.8 to 40 g/min. Other parameters, such as molten viscosity range, may be applied in another structure and process such as films, fibers, and blow molding. It has been appreciated that F10-01, F10-02, F10-03H, F15-33, F20-03, F25-03, F25-03H, F30-03, F40-03, and the like manufactured by Korea Engineering Plastics Co., Ltd. (KEPITAL®) may provide a range of options for examples of commercialized products of polyoxymethylene, and the examples are not limited thereto.

In an exemplary embodiment of the present invention, the homopolymer or the copolymer of polyoxymethylene may be used in an amount of about 70 to 99 wt %, or particularly, of about 80 to 95 wt % based on the total resin composition. When the homopolymer or the copolymer is used in an amount of less than about 70 wt %, thermal stability may be reduced, and thus a polyoxymethylene polymer may be decomposed; mechanical properties may be reduced; and a tribology property effect may be reduced. On the other hand, when the homopolymer or the copolymer is used in an amount of greater than about 99 wt %, hardness and tribology property may not be significantly improved due to a reduced amount of aramide used therein.

(B) Aramide Powder

As used herein, aramide powder may improve hardness and the tribology property, and may be mixed with the polyoxymethylene resin as the basic resin. The aramide powder may be included in an amount of from about 1 to about 30 wt %, or particularly in an amount of from about 5 to about 20 wt % based on the total resin composition. When the aramide powder is used less than about 1 wt %, hardness and tribology property may not be significantly improved. In addition, when the aramide powder is used in an amount greater than about 30 wt %, due to an increase in cost, no significant improvement may be expected considering a greater amount of the aramide powder, and thermal stability of the polyoxymethylene composition may be reduced, thereby decomposing the polyoxymethylene polymer and reducing mechanical properties.

In an exemplary embodiment of the present invention, an aramide particle may have a para structure and be formed of a repeating unit of Formula 1. As shown in Formula 1, since the aramide particle having a para structure has improved heat resistance, high strength, high elasticity, flame retardancy, and the like, p-aramide particle may be particularly used in the polyoxymethylene composition.

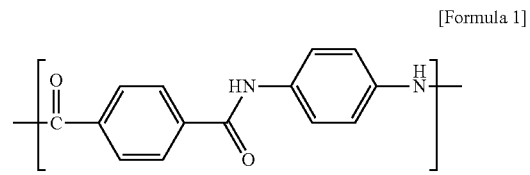

[Formula 1]

In particular, a poly(p-phenylene terephthalate) particle may be used as the aramide particle. As poly(p-phenylene terephthalate), a homopolymer may be generated in mole-to-mole polymerization of p-phenylene diamine and terephthaloyl chloride, and a copolymer may be manufactured by polymerization of diamine including p-phenylene diamine and diacidic chloride, for example, terephthaloyl chloride. It has been appreciated that Twaron 5011 Grade manufactured by Teijin Limited, Aramide manufactured by Hyosung Company, and the like may provide a range of options for the para type aramide resin, but the examples are not limited thereto.

In an exemplary embodiment, the aramide powder may include, without limitation, short staples, fibrils, fibrids, an irregular type, a sphere type, a disk type, or the like. In addition, an average diameter of the aramide powder particle may be in a range of about 0.1 to 500 μm, or particularly, of about 0.1 to 200 μm. When the average particle diameter is greater than about 500 μm, the tribology property, mechanical properties, and the like, may not be homogeneously expressed, thereby deteriorating thermal stability of polyoxymethylene and surface roughness of a formed article. In another exemplary embodiment, the aramide powder particle may be manufactured by pulverizing an unspun aramide polymer in a predetermined size.

(C) Thermoplastic Polyurethane

As used herein, thermoplastic polyurethane may have improved elastomer property and forming processability, reduce friction heat, and, particularly, significantly increase tensile elongation and impact strength by combination with another component in the composition according to an exemplary embodiment of the present invention. Thus, the thermoplastic polyurethane may be manufactured from, without limitation, polyol, organic diisocyanate, and, optionally, a chain extender by a typically used method.

Polyol is a compound having an active hydrogen component and including two or more hydroxyl groups per molecule on average, and exemplary polyols may include, without limitation, polyester polyol, polyether polyol, polyhydroxy polyester amide, hydroxyl-containing polycaprolactone, a hydroxy-containing acryl copolymer, hydroxy-containing epoxy, hydrophobic polyalkylene ether polyol, and the like.

In addition, an exemplary organic diisocyanate may include, without limitation, aliphatic diisocyanate, for example, ethylene diisocyanate, 1,4-tetramethylene diisocyanate, 1,12-dodecane diisocyanate, 1,6-hexamethylene diisocyanate, or a mixture thereof. Other exemplary organic diisocyanate may include, without limitation, cycloaliphatic diisocyanate, for example, isophorone diisocyanate, 1,4-cyclohexane diisocyanate, 1-methyl-2,4-cyclohexane diisocyanate, 1-methyl-2,6-cyclohexane diisocyanate, 4,4'-, 2,4'- or 2,2'-dicyclohexylmethane diisocyanate, or a mixture thereof. Another exemplary organic diisocyanate may include, without limitation, aromatic diisocyanate, for example, 2,4- or 2,6-toluene diisocyanate, 4,4'-diphenylmethane diisocyanate, 2,4'-diphenylmethane diisocyanate, 2,2'-diphenylmethane diisocyanate, naphthylene-1,5-diisocyanate, xylylene diisocyanate, methyl diphenyl isocyanate ("MDI"), hexamethylene diisocyanate ("HMDI"), or a mixture thereof.

The chain extender typically may have a number average molecular weight of about 60 to about 400, and contains amino, thiol, carboxyl, and/or hydroxyl functional groups. The chain extender in an exemplary embodiment of the present invention may have two to three and more hydroxyl groups, or particularly two hydroxyl groups. In particular, one or more types of compounds selected from aliphatic diol containing 2 to 14 carbon atoms may be used as the chain extender.

In another exemplary embodiment of the present invention, other components may be used to form thermoplastic polyurethane.

An exemplary thermoplastic polyurethane having a melting point in a range of about 75° C. to about 250° C., of about 100° C. to about 240° C., or particularly of about 120° C. to about 220° C., may be used. Meanwhile, an exemplary thermoplastic polyurethane having a glass transition temperature (Tg) in a range of about −150° C. to about 0° C., of about −100° C. to about −10° C., or particularly, of about −85° C. to about −20° C., in may be used. In particular, an exemplary thermoplastic polyurethane having hardness of Shore A in a range of about 73 to 100, density in a range of about 1.18 to 1.23, tensile strength in a range of about 40 to 54 MPa, and tensile elongation in a range of about 40 to 80% may be used.

In an exemplary embodiment of the present invention, the content of thermoplastic polyurethane may be about 1 to about 15 parts by weight, or particularly, about 2 to about 10 parts by weight based on 100 parts by weight of the basic resin including polyoxymethylene and the aramide powder. When the content is deviated from the aforementioned range, friction resistance and wear resistance may be reduced, and improvement in tensile elongation and impact strength may be reduced.

(D) Vinyl Acetate

As used herein, vinyl acetate (VA) may increase compatibility of polyoxymethylene and thermoplastic polyurethane, and improve dispersibility of other components in the composition, thereby increasing thermal stability, mechanical properties, the tribology property, dimensional stability, forming processability, and the like, and particularly, significantly increasing tensile elongation, impact resistance, and wear resistance.

In an exemplary embodiment of the present invention, vinyl acetate may be used in an amount of about 0.1 to about 2 parts by weight, or particularly of about 0.5 to about 1.5 parts by weight based on 100 parts by weight of the basic resin including polyoxymethylene and the aramide powder. When the content is deviated from the aforementioned range, improvement in various types of physical properties of the polyoxymethylene resin may not be achieved (e.g., may be insignificant).

(E) Ethylene Bis-stearamide

As used herein, ethylene bis stearamide in the polyoxymethylene resin composition may reduce shear stress during a compounding process by improving thermal stability and the tribology property of the composition.

In an exemplary embodiment of the present invention, the content of ethylene bis-stearamide may be in an amount of about 0.01 to about 2 parts by weight, or particularly of about 0.1 to about 1.0 parts by weight based on 100 parts by weight of the basic resin including the polyoxymethylene resin and the aramide powder. When the content of ethylene bis-stearamide is less than about 0.1 parts by weight, an effect thereof may not be significant; and when the content of ethylene bis-stearamide is greater than about 1.0 parts by weight, physical properties may be reduced, exfoliation may occur on a surface of the formed article, and an additional improvement effect may not be significant.

(F) Ehtylene Urea

As used herein, ethylene urea may improve heat resistance, a forming property, and long-term dimensional stability, increase mechanical properties, and reduce a discharge amount of formaldehyde to increase thermal stability. In an exemplary embodiment, 2-imidazolidone, imidazolidine-2-one, or the like may be used as ethylene urea without limitation. In an exemplary embodiment, ethylene urea may be prepared by a reaction of 1,2-ethylenediamine and urea by a typically used method. In particular, ethylene urea may be, but not limited to, a flake type, a pellet type, or a particle type.

In an exemplary embodiment of the present invention, ethylene urea may be used in an amount of about 0.01 to about 2 parts by weight, or particularly, of about 0.2 to about 1.0 parts by weight based on 100 parts by weight of the basic resin including the polyoxymethylene resin and the aramide powder. When the content of ethylene urea is less than the aforementioned range, an effect thereof may not be significant; and when the content is greater than the aforementioned range, the use thereof may not be economical.

(G) Polytetrafluoroethylene (PTFE) and Ultra-High Molecular Weight Polyethylene Powder As used herein, polytetrafluoroethylene may further improve friction or wear resistance, and lubricating properties, and may be included in a greater amount, if necessary.

In an exemplary embodiment of the present invention, the ultra-high molecular weight polyethylene powder may be used if necessary. In addition, when the ultra-high molecular weight polyethylene powder is added, a surface property of forming products may be significantly improved, and wear resistance, mechanical strength, and particularly, tensile strength may be further improved.

In particular, the ultra-high molecular weight polyethylene powder may be a particle having an average molecular weight of about $1 \times 10^6$ to $5 \times 10^6$ g/mol and an average particle diameter in a range of about 50 to 300 μm. When the average particle diameter is greater than 300 μm, wear resistance may be reduced, and wear resistance and mechanical strength may be improved within the aforementioned range. It has been appreciated that Hostalen GUR 4113™ (Ticona GmbH, Germany) and the like may provide a range of options for the ultra-high molecular weight polyethylene powder, but the examples are not limited thereto.

In an exemplary embodiment, the content of polytetrafluoroethylene, the ultra-high molecular weight polyethylene powder, or the mixture thereof may be in an amount of about 0.01 to 2 parts by weight, or particularly of about 0.1 to about 1.0 parts by weight based on 100 parts by weight of the basic resin including the polyoxymethylene resin and the aramide powder. When the content thereof is less than about 0.01 parts by weight, an effect thereof may not be significant insignificant; and when and the content thereof is greater than about 2.0 parts by weight, further improvement of physical properties may not be expected and may not be economical.

(H) Other Additive

As used herein, an additive generally used in related technical field may be added, if necessary. In an exemplary embodiment, the additive may include one or more of an antioxidant, a formaldehyde or formic acid removing agent, an end group stabilizer, a filler, a colorant, a lubricant, a release agent, an antistatic agent, a flame retardant, a reinforcing agent, a light stabilizer, a pigment, and the like. The additive may be used in a range which may not substantially deteriorate physical properties of the polyoxymethylene resin composition of the present invention.

An exemplary antioxidant may include, without limitation, sterically hindered bisphenol, for example, tetra-bis [methylene(3,5-di-t-butyl-4-hydro cinnamate)]methane, and it has been appreciated that Irganox® 1010 manufactured by Ciba-Geigy Corp. may provide a range of options for the antioxidant, but the examples are not limited thereto.

As used herein, a nitrogen-containing compound may be used as the end group stabilizer, and an exemplary nitrogen-containing compound may include, without limitation, at least one kind or two or more types of compounds selected from a reactive hot melt nylon resin which may include an amine terminus group, a non-reactive hot melt nylon which is not reactive at its terminus, and a low molecular weight amine-based compound. Although any one of the hot melt nylon resin, the nylon resin, and the low molecular weight amine-based compound may be used as the nitrogen-containing compound, the low molecular weight amine-based compound having a melting point in a range of about 230° C. or less may be particularly used. In an exemplary embodiment, a compound selected from triazines, hydrazines, ureas, dicyandiamide, and the like may be used as the low molecular weight amine-based compound.

In other exemplary embodiment, melamine, acetguanamine, acryloguanamine, benzoguanamine, and the like may be used as examples of triazines. In another exemplary embodiment, adipic acid dihydrazide, sebacic acid dihydrazide, isophthalic acid dihydrazide, terephthalic acid dihydrazide, naphthalic acid dihydrazide, and the like may be used as hydrazines. In still another exemplary embodiment, urea, thiourea, and the like may be used as ureas. The nitrogen containing compound may be used alone or in combination of two or more types. As used herein, glass fibers, glass flakes, glass beads, talc, mica, potassium titanate whiskers, and the like may be used as the filler.

Meanwhile, the polyoxymethylene resin composition according to an exemplary embodiment of the present invention may be a molten mixture blend, in which all polymer components may be dispersed substantially and all nonpolymer components may be dispersed substantially in a polymer matrix to be bonded, and thus the blend may form a homogeneous mixture.

The polyoxymethylene resin composition according to an exemplary embodiment of the present invention may be manufactured by performing blending by using a general mixer, for example, a Brabender mixer. In addition, melting and kneading the blend may be performed at a temperature range that may be greater than a melting point of a polyoxymethylene base material resin, for example, in a range of about 180 to about 230° C., or particularly of about 190 to about 210° C., using a general single or twin screw extruder. Further, each component may be dried before the blending. Drying may be performed at a temperature in a range of about 70 to about 110° C., for about 2 to about 6 hours using dry air having a dew point in a range of about −30 to about −40° C.

In another exemplary embodiment, the formed article manufactured from the polyoxymethylene resin composition may be manufactured by a predetermined method known to a person with ordinary skill in the art, without limitation, for example, extrusion, injection molding, extrusion molding, blow molding, thermoforming, rotational molding, and melting casting. An exemplary formed article may include, without limitation, bearings, gears, cams, rollers, sliding plates, levers, guides, conveyor parts, and the like.

EXAMPLES

The following examples illustrate the invention and are not intended to limit the same. Hereinafter, detailed description of the present invention may be obtained in light of the following Examples which are not to be construed to limit the present invention. In the Examples, physical properties were measured by the following measurement methods.

1) Tensile Strength and Tensile Elongation

Tensile strength and tensile elongation were measured using UTM (United STM-10, USA) according to ISO527.

2) Charpy Impact Strength

Measurement was performed based on ISO179/1eA that was the charpy impact test standard. The measurement was performed under the environment of about −40° C. using the charpy impact tester "258-PLA" manufactured by Yasuda Seiki seisakusho LTD.

3) Tribology Property

Physical properties were measured according to the JIS K7218 method.

Friction and wear properties were tested by equipping the ring-shaped specimen in the tester, and evaluated with the applied force and the wearing amount by varying predetermined loads and speeds when rotation was performed. The ring-shaped specimen is made of a plastic material and metal (e.g., S45C, copper, SUS, and the like), and if necessary, may be made of other material. The measurement was performed at the load in a range of about 0.1 kgf to 500 kgf and at the speed in a range of about 1 mm/sec to 1000 mm/sec.

1. Ring-on-ring evaluation condition: counterface=metal (S45C), load=11.8 kgf, speed=300 mm/s, time=120 min 2. Pin-on-disk evaluation condition: counterface=same resin, load=2 kgf, speed=2 Hz, time=30 min (4) Kinetic Friction Coefficient Force applied was measured and converted when the two materials were rubbed.

Example 1

About 5 parts by weight of thermoplastic polyurethane (hereinafter, TPU), about 1 part by weight of vinyl acetate (hereinafter, VA), about 0.2 parts by weight of ethylene bis stearamide (hereinafter, EBS), about 0.2 parts by weight of ethylene urea (Finecn Chemical Co., Ltd. (China)), and about 0.2 parts by weight of the antioxidant (Ciba-Geigy Corp., Irganox® 1010) were mixed based on 100 parts by weight of the basic resin including about 95 wt % of polyoxymethylene (hereinafter, POM; Korea Engineering Plastics Co., Ltd. (KEPITAL®) F10-03H) and about 5 wt % of the aramide powder (Teijin Limited, Twaron 5011, average particle diameter 100 μm) were mixed.

The mixture was placed into the hopper of the twin screw extruder (e.g., twin screw compounding machine manufactured by JSW Corporation, Japan) to be compounded. The screw speed was about 180 rpm, and the temperature condition was about 190° C. The thus manufactured resin composition was injected through the injection molder (e.g., Fanuc Corporation, electric injection machine, injection speed: about 20 mm/s, injection pressure: about 700 kgf, measuring: about 50 mm, cooling time: about 10 sec, mold temperature: about 80° C.) to be molded into specimen.

The physical properties were measured by the aforementioned method using the manufactured exemplary specimens, and the results are described in Table 2.

Example 2

According to Table 1, the same method as Example 1 was performed to manufacture an exemplary specimen, except that the contents of polyoxymethylene and the aramide powder were changed and used in Example 1.

Example 3

According to Table 1, the same method as Example 1 was performed to manufacture an exemplary specimen, except that the contents of polyoxymethylene and the aramide powder were changed and used in Example 1.

Comparative Example 1

According to Table 1, the same method as Example 1 was performed to manufacture an exemplary specimen, except that thermoplastic polyurethane and vinyl acetate were not included.

Comparative Example 2

According to Table 1, the same method as Example 1 was performed to manufacture an exemplary specimen, except that vinyl acetate was not included.

Comparative Example 3

According to Table 1, the same method as Example 1 was performed to manufacture an exemplary specimen, except that the content of thermoplastic polyurethane was changed into about 15 parts by weight.

Comparative Example 4

According to Table 1, the same method as Example 1 was performed to manufacture an exemplary specimen, except that thermoplastic polyurethane was not included.

Comparative Example 5

According to Table 1, the same method as Example 1 was performed to manufacture an exemplary specimen, except that thermoplastic polyurethane was not included and the content of vinyl acetate was changed into about 3 parts by weight.

Comparative Example 6

According to Table 1, the same method as Example 1 was performed to manufacture an exemplary specimen, except that the content of thermoplastic polyurethane was changed into about 15 parts by weight and the content of vinyl acetate was changed into 3 parts by weight.

Comparative Example 7

According to Table 1, the same method as Example 1 was performed to manufacture an exemplary specimen, except that the content of polyoxymethylene was changed into about 65 wt % and the content of the aramide powder was changed into about 35 wt %.

Comparative Example 8

According to Table 1, the same method as Example 1 was performed to manufacture an exemplary specimen, except that the content of polyoxymethylene was set to about 100 wt % and the aramide powder, thermoplastic polyurethane, and vinyl acetate were excluded.

TABLE 1

| Classification | POM (wt %) | Aramide (wt %) | TPU (parts by weight) | VA (parts by weight) | EBS (parts by weight) | Ethylene urea (parts by weight) | Antioxidant (parts by weight) |
|---|---|---|---|---|---|---|---|
| Example 1 | 97.5 | 2.5 | 5 | 1 | 0.2 | 0.2 | 0.15 |
| Example 2 | 80.0 | 20.0 | 5 | 1 | 0.2 | 0.2 | 0.15 |
| Example 3 | 99.0 | 1.0 | 5 | 1 | 0.2 | 0.2 | 0.15 |
| Comparative Example 1 | 97.5 | 2.5 | — | — | 0.2 | 0.2 | 0.15 |
| Comparative Example 2 | 97.5 | 2.5 | 5 | — | 0.2 | 0.2 | 0.15 |
| Comparative Example 3 | 97.5 | 2.5 | 15 | 1 | 0.2 | 0.2 | 0.15 |
| Comparative Example 4 | 97.5 | 2.5 | — | 1 | 0.2 | 0.2 | 0.15 |
| Comparative Example 5 | 97.5 | 2.5 | — | 3 | 0.2 | 0.2 | 0.15 |
| Comparative Example 6 | 97.5 | 2.5 | 15 | 3 | 0.2 | 0.2 | 0.15 |
| Comparative Example 7 | 65.0 | 35.0 | 5 | 1 | 0.2 | 0.2 | 0.15 |
| Comparative Example 8 | 100.0 | 0.0 | 0 | 0 | 0.2 | 0.2 | 0.15 |

TABLE 2

| Classification | Tensile elongation (%) | Charpy impact strength | Ring-on-ring type | | Pin-on-disk type | |
| --- | --- | --- | --- | --- | --- | --- |
| | | | Kinetic friction coefficient | Specific wear amount (mm³/kgfkm) | Kinetic friction coefficient | Specific wear amount (mm³/kgfkm) |
| Example 1 | 35 | 7 | 0.12 | 0.03 | 0.20 | 4.6 |
| Example 2 | 30 | 6 | 0.12 | 0.03 | 0.21 | 5.7 |
| Example 3 | 35 | 7 | 0.12 | 0.01 | 0.22 | 5.3 |
| Comparative Example 1 | 5 | 2.0 | 0.40 | 0.50 | 0.53 | 7.2 |
| Comparative Example 2 | 10 | 3.0 | 0.30 | 0.25 | 0.40 | 7.0 |
| Comparative Example 3 | 30 | 10 | 0.80 | 1.18 | 0.92 | 9.9 |
| Comparative Example 4 | 5 | 2.0 | 0.38 | 0.50 | 0.52 | 7.1 |
| Comparative Example 5 | 6 | 2.2 | 0.38 | 0.49 | 0.51 | 7.0 |
| Comparative Example 6 | 30 | 11 | 1.01 | 1.27 | 0.99 | 10.5 |
| Comparative Example 7 | 20 | 4 | 0.25 | 0.55 | 0.40 | 7.7 |
| Comparative Example 8 | 35 | 6 | 0.43 | 6.2 | 0.82 | 10.2 |

As shown in Table 2, in the polyoxymethylene resin composition according to an exemplary embodiment of the Example of the present invention, tensile elongation and impact strength may be significantly improved. Further, as shown in the results of the Comparative Examples, when one component of the polyoxymethylene resin composition of the present invention was excluded, a target physical property effect may not be obtained.

As described above, the limitative embodiments of the present invention have been disclosed for illustrative purposes, but are not limited thereto, and those skilled in the art will appreciate that various modifications and substitutions are possible from the disclosure in the art to which the present invention belongs. Accordingly, the spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

The polyoxymethylene resin composition according to the present invention may be applied to various engineered plastics. The exemplary formed article that may be manufactured from the various engineered plastics from the polyoxymethylene resin composition according to various exemplary embodiment of the present invention, and the formed article which may be used for a vehicle part may include bearings, gears, cams, rollers, sliding plates, levers, guides, conveyor parts, and the like. Therefore, the polyoxymethylene resin composition of the present invention may be applied to manufacture parts for vehicles.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A polyoxymethylene resin composition for manufacturing a door checker guide part of a vehicle, consisting of:
   polyoxymethylene;
   an aramide powder;
   thermoplastic polyurethane;
   vinyl acetate;
   ethylene bis stearamide; and
   ethylene urea,
   wherein the aramide powder is an aramide resin which is formed of a repeating unit of Formula 1:

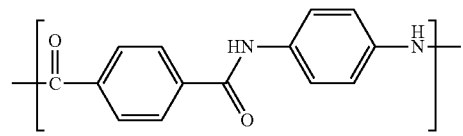

Formula 1 and the aramide powder includes the particles having the average particle diameter in a range of about 0.1 to 200 µm,
   wherein the composition comprises about 1 to 15 parts by weight of thermoplastic polyurethane, about 0.1 to 1 parts by weight of vinyl acetate, about 0.01 to 2 parts by weight of ethylene bis-stearamide, and about 0.01 to 2 parts by weight of ethylene urea based on 100 parts by weight of a basic resin in which about 70 to 99 wt % of polyoxymethylene and about 1 to 30 wt % of the aramide powder are included.

2. The polyoxymethylene resin composition of claim 1, wherein thermoplastic polyurethane has hardness of Shore A in a range of about 73 to 100, density in a range of about 1.18 to 1.23, tensile strength in a range of about 40 to 54 MPa, and tensile elongation in a range of about 40 to 80%.

3. The polyoxymethylene resin composition of claim 1, further comprising: a polytetrafluoroethylene powder, an ultra-high molecular weight polyethylene powder having an average molecular weight in a range of about $1 \times 10^6$ to $5 \times 10^6$ g/mol, or a mixture thereof.

4. The polyoxymethylene resin composition of claim 1, further comprising:
   about 0.01 to 2 parts by weight of a polytetrafluoroethylene powder, an ultra-high molecular weight polyethylene powder having an average molecular weight in a range of about $1\times10^6$ to $5\times10^6$ g/mol, or a mixture thereof based on 100 parts by weight of the basic resin.

5. The polyoxymethylene resin composition of claim 1, wherein ethylene urea is 2-imidazolidone or imidazolidine-2-one.

6. A formed article manufactured by using the polyoxymethylene composition of claim 1.

7. The formed article of claim 6, wherein the formed article is a door checker guide part of a vehicle.

* * * * *